United States Patent [19]

Stover, III

[11] 3,827,268

[45] Aug. 6, 1974

[54] APPARATUS FOR MAKING SELF-LOCKING BOLTS

[75] Inventor: Jordan H. Stover, III, Tucson, Ariz.

[73] Assignee: Rockford Screw Products Company, Rockford, Ill.

[22] Filed: Oct. 5, 1973

[21] Appl. No.: 403,789

Related U.S. Application Data

[60] Division of Ser. No. 149,152, June 2, 1971, Pat. No. 3,763,903, which is a continuation-in-part of Ser. No. 770,359, Oct. 24, 1968, Pat. No. 3,601,830.

[52] U.S. Cl. ..................................... 72/90, 72/469
[51] Int. Cl. ......................................... B21h 3/06
[58] Field of Search ............. 72/88, 90, 469; 10/10, 10/27

[56] References Cited
UNITED STATES PATENTS

| | | | |
|---|---|---|---|
| 2,284,659 | 6/1942 | Hoshing | 72/88 |
| 3,044,329 | 7/1962 | Seibert | 72/90 |
| 3,163,196 | 12/1964 | Hanneman | 151/37 |
| 3,459,250 | 8/1969 | Tabor | 72/88 X |

*Primary Examiner*—Milton S. Mehr
*Attorney, Agent, or Firm*—Cyrus S. Hapgood

[57] ABSTRACT

A thread is rolled on the bolt blank around a predetermined length thereof by a pair of thread-rolling dies, and during the thread-rolling operation the bolt is indented at diametrically opposed parts of its threaded length, to give a portion of this length a generally elliptical cross section which is near but spaced from the leading end of the bolt, the indented portion surrounding a central axial bore which opens through the leading end of the bolt. The thread-rolling dies are arranged to provide the thread on the major axis of the elliptical cross-section with a pitch diameter slightly greater than the normal pitch diameter above the elliptical section, such as about 1.03 times the normal pitch diameter, to provide the self-locking action. Thus the friction which causes the self-locking action occurs along the flanks of the threads, rather than at the crests and roots.

6 Claims, 11 Drawing Figures

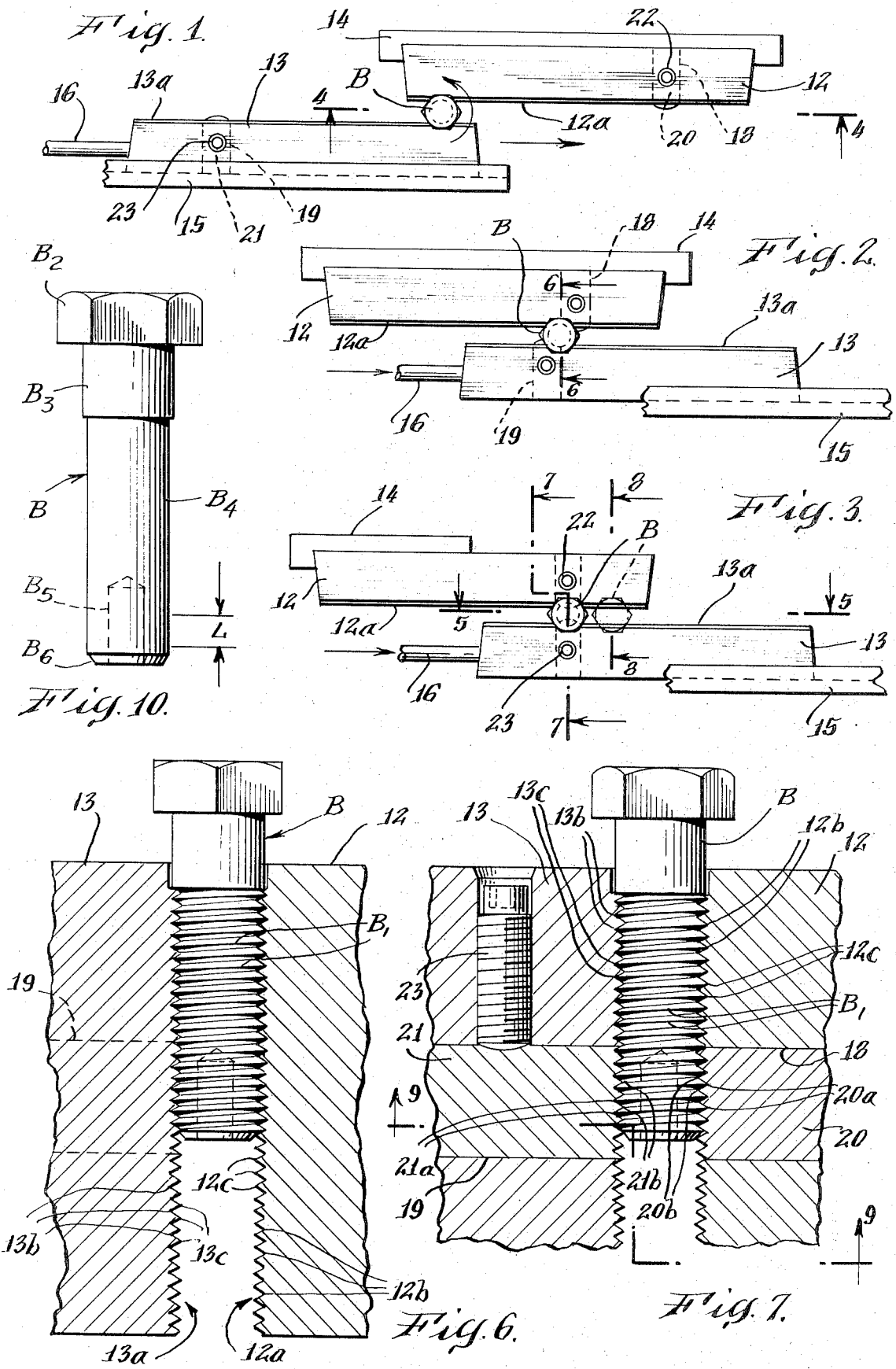

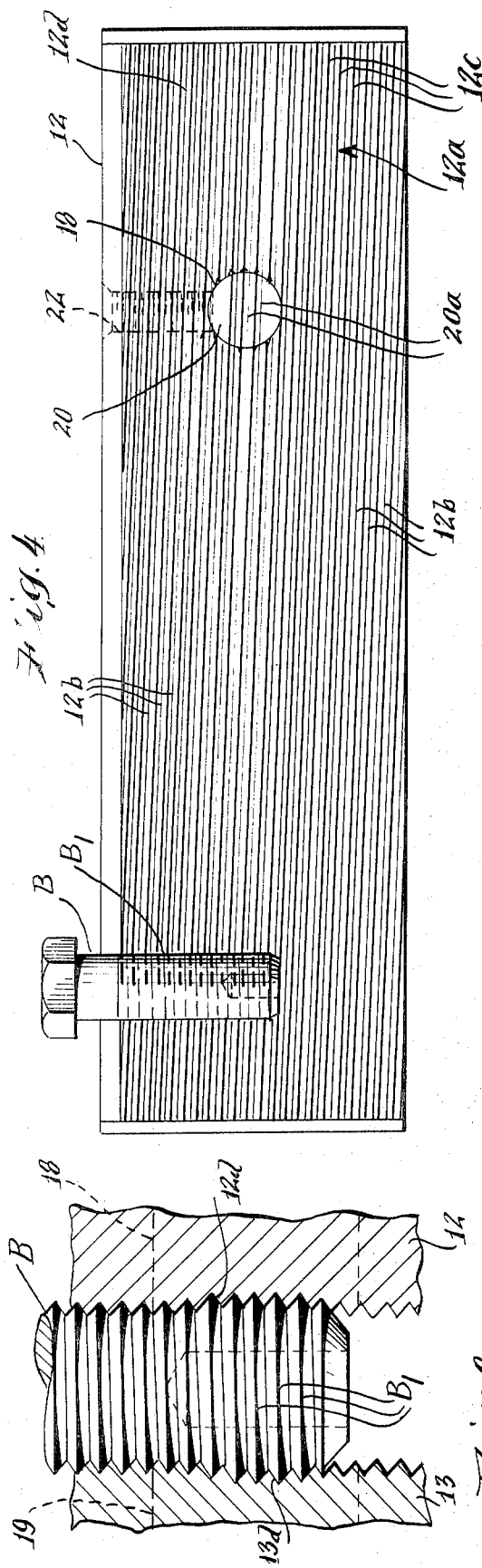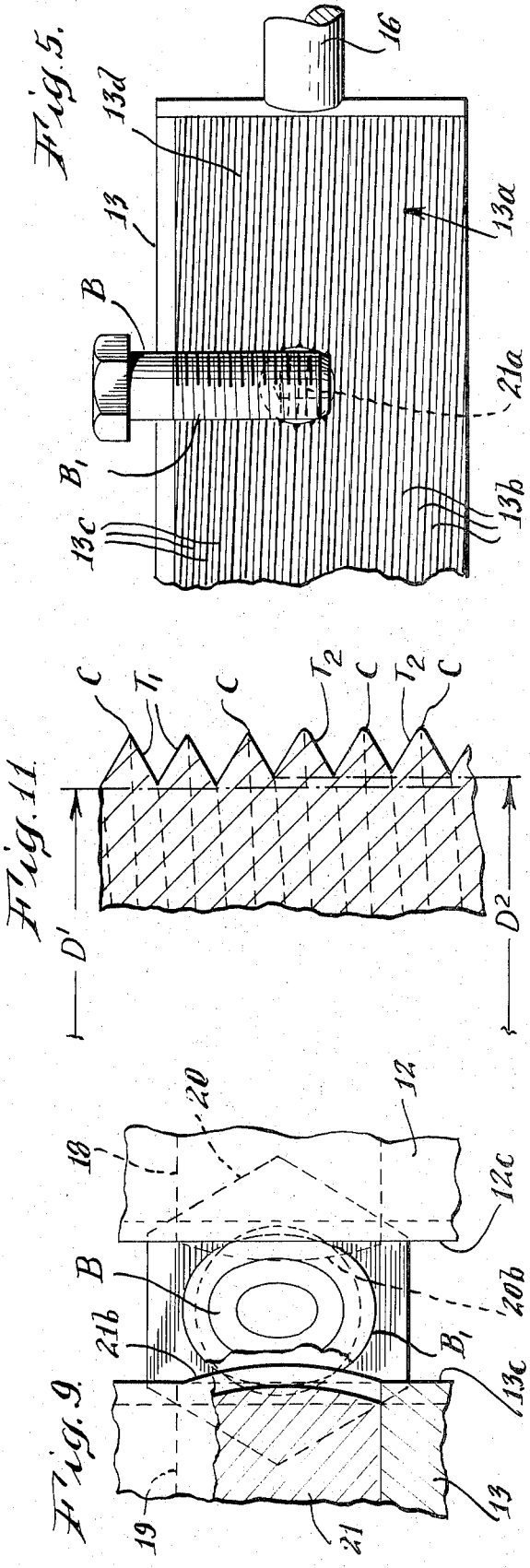

APPARATUS FOR MAKING SELF-LOCKING BOLTS

This application is a division of my copending application Ser. No. 149,152, filed June 2, 1971, now U.S. Pat. No. 3,763,903 which is a continuation-in-part of my application Ser. No. 770,359 filed Oct. 24, 1968 (now U.S. Pat. No. 3,601,830 dated Aug. 31, 1971).

This invention relates to an improved apparatus for making a self-locking bolt.

The present invention is not limited to bolts as such but is also applicable to other externally threaded devices, such as studs and set screws; and it is to be understood that the term "bolt" as used herein is intended to encompass such other devices.

The majority of prior self-locking bolts depend upon the plastic deformation of a nylon plug or insert for their locking action, or upon the plastic deformation of the metal in the thread of the bolt itself. Such bolts using a nylon plug or insert have several disadvantages. Nylon cannot withstand heat in excess of 300° F., and there are many applications for such bolts where temperatures exceed that value, such as exhaust manifold bolts and cylinder head bolts. Moreover, the inability of this soft material to withstand high temperatures causes other difficulties. A very substantial portion of bolts going into present day use must be heat treated to increase their strength. Heat treating temperatures are almost always above 300° F., and it is then necessary to insert the nylon plugs or inserts after the heat treating operation when the bolt threads are hardened. The plugs or inserts must be crimped into position, which is difficult to accomplish without raising burrs and other undesirable defects in the hardened threads. Another disadvantage of the nylon plugs or inserts is that they frequently protrude beyond the crest of the thread, so that in their normal use they are apt to be either forced out of the bolt hole or sheared off, thus reducing their locking effectiveness. An additional disadvantage is that rough tapped holes tend to shear off the nylon rather than compress it as intended.

As for the prior lock bolts which depend upon plastic deformation of the metal in the bolt threads, such bolts have the disadvantage that the tapped hole in which they are to be used must be held to extremely close tolerances, because otherwise they tend to freeze or gall in a minimum UNC-2B or UNF-2B tapped hole and tend to develop insufficient locking ability in a maximum UNC-2B or UNF-2B tapped hole. Additionally, the plastic deformation tends to return to normal when the bolt is highly stressed from 50 percent of yield up to yield, and good tightening practice is considered to be 75 percent of yield.

An object of the present invention is to provide a self-locking bolt which overcomes the above-mentioned disadvantages. The temperature limitations of the new bolt are only the temperature limitations of the metal from which it is made, and its self-locking feature depends upon a spring action which allows it to adjust to minimum and maximum tapped holes in which the bolt is to be used. Also, because of the spring action, the locking feature is retained even when the bolt is tightened to yield. Moreover, the new bolt can be made to produce the prevailing torque requirements as well as the torque tension requirements prescribed for self-locking nuts in the Industrial Fasteners Institute specifications 100 and 101.

The self-locking bolt of the present invention is preferably made from a specially constructed blank of which the shank portion to be threaded has a diameter about 0.4 percent less than the basic pitch diameter of the desired thread. The basic pitch diameter is defined as the diameter midway between the thread's maximum outer diameter and its maximum inner or minor diameter (as measured at the crest and at the root, respectively) for a fully formed thread. An axial bore opens through the leading end of the bolt blank and has a length of about 1D and a diameter between 0.35 and 0.50D, where D is the nominal outer diameter of the thread to be formed on the blank. The bore length is limited to about 1D to avoid weakening the bolt when it is screwed into a tapped hole for one full diameter of full thread engagement. This one diameter of full thread engagement does not include the first two threads at the leading end because they are considered to be part of the chamfer or lead-in of the bolt and thus are not full threads. The special bolt blank is also preferably provided with a 30° chamfer which is about 0.2D in length from the leading end.

As will presently appear, the axial bore in the bolt blank and the slightly reduced diameter of the length to be threaded are of great advantage in providing the desired locking action without freezing or galling of the threaded bolt in a minimum tapped hole.

The threaded blank forming the new lock bolt is provided with a pair of diametrically opposed indentations and a pair of diametrically opposed protrusions between the indentations, these permanent distortions occupying only part of the threaded length which contains the axial bore and providing it with a generally elliptical cross-section. The latter is spaced from the leading end of the bolt and also from the inner end of the axial bore, and it preferably occupies about one-half of the length surrounding the bore. The thread on the major axis of the ellipse has an outer pitch diameter slightly greater than the normal pitch diameter but sufficient to provide a certain friction-locking prevailing torque described hereinafter, an example of this outer pitch diameter being 1.03 greater than normal.

In making the new lock bolt, the thread is rolled around a predetermined length of the blank; and while the thread-rolling operation is still in progress, diametrically opposed parts of the blank are simultaneously indented at a selected portion of its threaded length, thereby providing this portion with a generally elliptical cross-section spaced from but near the leading end of the bolt. The thread-rolling operation may be continued after the indenting has been effected, and in that case those flutes of the die which would otherwise act upon the elliptical section are relieved so as to preserve the elliptical shape.

The apparatus for making the lock bolt comprises a pair of coacting thread-rolling dies, each of which is provided with a working face having a series of adjacent parallel main flutes forming coplanar crests. The dies are mounted with the two working faces in opposed spaced relation so that the crests of their respective flutes are engageable simultaneously with diametrically opposed parts of the bolt blank over its length to be threaded. The bolt blank is positioned with its axis almost at a right angle to the direction of the parallel flutes, the deviation from a right angle depending upon the desired pitch of the thread to be rolled; but the parallel flutes on the respective faces are slanted in opposite directions relative to the axis of the blank. The mounting means for the dies are such that one die is movable relative to the other at right angles to the axis of the bolt blank clamped between the opposed working faces, thereby rotating the blank about its axis while rolling a thread on the blank, due to the action of the flutes. The flutes of each working face increase gradually in depth in the direction in which the blank rolls along the face during the aforesaid relative movement, so that the thread becomes deeper as the thread-rolling operation proceeds.

The apparatus described so far is well known in the art. According to the present invention, however, the working face of each die is provided with a plurality of adjacent parallal auxiliary flutes forming crests which protrude from the plane of the crests on the main flutes, the protruding crests being of a length not exceeding the spacing between the working faces, which is essentially the nominal diameter of the threaded bolt. The auxiliary flutes on each face are substantially fewer in number than the main flutes and are aligned longitudinally with corresponding main flutes.

As the thread-rolling operation proceeds, due to the relative movement between the dies, the auxiliary flutes on the respective working faces simultaneously engage diametrically opposed parts of the blank at the portion of its threaded length where the elliptical cross-section is to be formed, thereby indenting these opposed parts and at the same time forming diametrically opposed protrusions between the indentations. The main flutes of each working face which are not aligned with auxiliary flutes are preferably continued beyond the latter in the direction in which the blank rolls along the face, to permit continuation of the thread-rolling operation after making the indentations. In this preferred construction, however, the main flutes aligned with auxiliary flutes of each face are relieved beyond the latter flutes in the aforesaid blank-rolling direction, to prevent distortion of the elliptical shape formed by the indentations. Moreover, although this relief of the main flutes preserves the increased pitch diameter of the threads on the major axis of the elliptical cross-section, it limits their crest diameter on this axis to the nominal diameter of the bolt so that the latter does not require an over-sizing of the untapped hole in a work piece through which the bolt must pass.

Preferably, a cylindrical bore opens through the working face of each die and receives a cylindrical insert, the auxiliary flutes being provided on the outer end of the insert, and the latter having a diameter which is substantially the nominal diameter of the threaded bolt. Means are provided for releasably locking each insert in its bore, so that the insert can be adjusted and replaced.

For a more complete understanding of the invention, reference may be had to the accompanying drawings, in which:

FIG. 1 is a schematic plan view of a preferred form of the new apparatus, showing the bolt blank and dies as positioned at the initial stage of the thread-rolling operation;

FIG. 2 is a similar view showing the positioning of the dies and blank after completing part of the thread-rolling operation and just prior to the indenting operation;

FIG. 3 is a similar view of the parts as positioned in the indenting operation;

FIGS. 4 and 5 are face views of the respective dies as seen on the lines 4—4 and 5—5 in FIGS. 1 and 3, respectively, and showing the corresponding positions of the bolt blank, part of the die;

FIGS. 6, 7, 8 and 9 are sectional views on the lines 6—6 in FIG. 2, 7—7 and 8—8 in FIG. 3, and 9—9 in FIG. 7, respectively;

FIG. 10 is a side elevational view of the special bolt blank before it is acted upon by the apparatus, and FIG. 11 is an enlarged sectional view of part of a preferred form of the new lock bolt, the section being taken along the bolt axis and along the major axis of the elliptical cross-section.

Referring to the drawings, the two thread-rolling dies are shown at 12 and 13, respectively, in FIGS. 1–3. The die 12 as shown in held stationary in a fixed mount 14, while a mount 15 supports and guides die 13 for longitudinal movement relative to die 12, the respective opposed working faces 12a and 13a being maintained in spaced parallal relation. Movement of die 13 is effected by a rod 16, such as a piston rod, which moves to the right for the working stroke while the bolt blank B is clamped in a vertical position between the working faces 12a and 13a. Thus, the blank B is rotated counter-clockwise about its axis as it rolls along the opposed working faces during the working stroke of die 13, as shown in FIGS. 1–3.

Of course, the die 12 instead of being held stationary may be moved in a direction opposite to the direction of movement of die 13 during its working stroke. In either case the same desired result is obtained in that the bolt blank B in effect rolls from left to right along the face of the die 12 and from right to left along the face of die 13. As will presently appear, this rolling movement serves to roll a thread on the blank B and also provide its threaded portion with diametrically opposed indentations, due to the construction of the working faces 12a and 13a.

It will be understood that the working operation is completed when the left end of die 13 passes the right end of die 12 (as viewed in FIGS. 1–3), thereby releasing the threaded and indented bolt B from between the working faces 12a and 13a.The movement of rod 16 is then reversed to retract die 13 until its right end is about flush with the left end of die 12, to permit repetition of the working operation with a new bolt blank B inserted between the working faces 12a and 13a.

Referring now to FIG. 4, the working face 12a of die 12 has a series of adjacent parallel main flutes 12b extending generally lengthwise of the face but slanting downwardly from left to right at a slight angle to the horizontal. As shown particularly in FIGS. 6 and 7, the adjacent flutes 12b are substantially V-shaped in cross-section and form spaced parallel crests 12c which are coplanar. That is, the crests 12c formed by all the adjacent parallel flutes 12b lie in a common vertical plane as shown in FIGS. 6 and 7, so that the crests appear as a straight horizontal in FIGS. 1–3.

The die face 13a is also provided with a series of adjacent parallel main flutes 13b having the same cross-section as the flutes 12b and forming similar crests 13c, the common plane of the crests 13c being parallel to the plane of the opposing crests 12c. As shown in FIG. 5, the flutes 13b slant downward from left to right at the same angle to the horizontal as the flutes 12b in FIG. 4. However, since FIGS. 4 and 5 are views as seen in opposite directions from the space between the working faces 12a and 13a (see the section line 4—4 in FIG. 1 and 5—5 in FIG. 3), the flutes 13b actually slant in the direction opposite to the direction of the slant of the opposing flutes 12b. Thus, the flutes of each working face slant downwardly in the direction in which the bolt blank B rolls along the working face, because during the working stroke of die 13 as seen in FIGS. 1–3, the blank B rolls from left to right along the working face 12a and from right to left along the opposed working face 13a.

The flutes 12b and 13b increase gradually in depth in the direction in which the bolt blank B rolls along the respective flutes. Consequently, during the working stroke of die 13, a thread B1 is rolled around the shank of the blank B, the depth of the thread increasing gradually as the thread-rolling operation proceeds. At the start of the thread-rolling operation, the bolt blank B is inserted between the dies 12 and 13 with the axis of the blank extending vertically, that is, at right angles to the horizontal as viewed in FIGS. 4 and 5 and normal to the direction of movement of die 13 as viewed in FIGS. 1–3; and the blank is maintained in this position throughout the working operation, due to its being clamped between the opposed working faces 12a and 13a. With this thread-rolling operation, as known in the art, the pitch of the thread B1 depends upon the angle at which the flutes 12b and 13b slant relative to the horizontal (FIGS. 4 and 5). The greater this slant angle, the greater the pitch of the thread B1.

In the apparatus of the invention as illustrated, the dies 12 and 13 are provided with transverse cylindrical bores 18 and 19, respectively, opening through the respective working faces 12a and 13a at the same level below their upper edges. Closely received in these bores are cylindrical inserts 20 and 21, respectively, which are releasably locked in position by set screws 22 and 23, respectively. As shown particularly in FIGS. 7 and 9, the inner ends of the inserts 20 and 21 are provided with adjacent parallel auxiliary flutes 20a and 21a having the same cross-section as the main flutes 12b and 13b but forming crests 20b and 31b, the pitch diameters of which protrude from the planes of the respective main crests 12c and 13c. The auxiliary flutes and their respective crests and pitch diameters 20b and 21b are slightly bowed so that their maximum protrusion is midway between their ends, as best shown in FIG. 9. As shown in FIG. 4, the auxiliary flutes 20a are aligned with corresponding main flutes 12b on the working face 12a, so as to form continuations thereof, and the same is true of the auxiliary flutes 21a on the other working face 13a (FIG. 5).

The diameter of each cylindrical insert 20 and 21 is equal to the nominal outer diameter D of the threaded lock bolt to be produced, which is equal to the spacing between the opposed working faces 12a and 13a as measured from the bottoms of their respective flutes 12b and 13b at their maximum depth (at their ends toward which the bolt blank B rolls during the thread-rolling operation). Thus, the length of each of the protruding auxiliary crests 20b and 21b does not exceed the spacing between the opposed working faces 12a and 13a.

As the thread-rolling operation proceeds, and after the thread B1 has been rolled to part of its final depth, the auxiliary flutes 20a and 21a simultaneously engage diametrically opposed parts of the blank B at a portion of its threaded length, thereby indenting the opposed parts and giving the bolt an elliptical shape at the aforesaid portion of its length, as shown in FIG. 9.

The protrusion of the auxiliary pitch diameters 20b and 21b is sufficient so that the outer pitch diameter of the thread B1, on the major axis of the ellipse as shown in FIG. 9, is greater than the nominal outer pitch diameter D of the thread upon completion of the thread-rolling operation. The amount of this pitch diameter protrusion on the major axis of the ellipse should be sufficient to product a prevailing torque of $115 \times (D)^{2.4}$ as a minimum and $820 \times (D)^{2.5}$ as a maximum in a mating tapped hole of UNC–2B to UNF–2B dimensions, after the self-locking bolt has been coated with a protective coating such as phosphate black or cadmium plating and lubricated with a solution of mineral spirits and wax or other lubricant required to meet torque tension requirements, such as those prescribed by the Industrial Fasteners Institute specifications 101. A protrusion of about 0.01D will be sufficient in many cases, although the amount of this protrusion can be varied somewhat depending upon the type of steel used in the bolt blank B and the heat treatment required for strengthening. For instance, a relatively high carbon steel heat treated to provide a relatively high tensile strength will produce a stiffer spring action than a lower carbon steel heat treated to a lower tensile strength, so that a slightly smaller amount of protrusion could be used for the higher carbon steel after allowing for a slight size change in heat treatment and a possible slight thread warpage.

The working stroke of die 13 continues after the indenting operation, so as to roll the thread B1 to its final depth. However, to prevent this continuance from distorting the threaded bolt B at its indented elliptical portion shown in FIG. 9, there must be a relief of those main flutes 12b and 13b which are aligned with corresponding auxiliary flutes 20a and 21a and which lie between the latter and the end of the corresponding working face toward which the blank B rolls during the thread-rolling operation. These relieved portions of the working face are shown at 12d and 13d, respectively, in FIGS. 4 and 5. As shown in FIG. 8, the relieved portions 12d and 13d are spaced farther from each other than the other portions of the opposed working faces of dies 12 and 13. This increased spacing is sufficient to accommodate the thread B1 at its maximum diameter along the major axis of the elliptical cross-section, as shown in FIG. 8.

The specially constructed bolt blank B, as shown in FIG. 10, has a hexagonal head B2 and a shank B3. The portion of the shank to be threaded, and which is shown at B4, has a diameter which is about 0.4 percent less than the basic pitch diameter of the thread B1 to be rolled. This slight reduction in the corresponding diameter provided according to conventional practice has the effect of preventing the lock bolt from freezing or galling in a minimum tapped hole due to the locking action of the elliptical cross-section shown in FIG. 9. The central axial bore B5 is about 1D long and from 0.35D to 0.5D in diameter, where D is the nominal outer diameter of the thread to be rolled on the blank. As shown, the bore B5 opens through the leading end of the bolt blank and extends through only a minor part of the length B4 to be threaded. The diametrically opposed indentations formed by the auxiliary flutes 20a and 21a (FIGS. 4, 5, 7 and 9) are confined to only part of the length occupied by the bore B5, this length part being shown at L in FIG. 10. The length L as there shown represents the length of the threaded bolt engaged by the opposed auxiliary flutes 20a and 21a shown in FIG. 7, which is essentially the length of the ovalized or elliptical cross-section shown in FIG. 9. As appears from FIG. 10, this length part L is about one-half the length of bore B5 and is spaced nearer to the inner end of the bore than to its outer end where it opens through the leading end of the bolt blank. For instance, the length part L may be spaced 0.3D from the outer end of the bore and 0.2D from the inner end of the bore. The chamfered end portion B6 of the blank occupies about 0.2D of its length, the chamfer angle being about 30°.

Of course, the spacing of the inserts 20 and 21 from the upper edges of the respective working faces 12a and 13a (FIGS. 4, 5 and 7) is such that the protruding auxiliary flutes 20a and 21a will engage diametrically opposed parts of the threaded blank only over the limited length L in FIG. 10. Thus, the spacing of the axis of each cylindrical insert 20 and 21 from the upper end of the corresponding working face (FIGS. 4 and 5) will correspond to the spacing of the mid-point of length part L from the inner end of the length portion B4 to be threaded, as shown in FIG. 10.

It will be understood that the lock bolt configuration as shown in FIG. 8 does not represent the final configuration, since the rolling of the normal threads is incomplete as shown in FIG. 8. In the final part of the thread-rolling operation, the normal threads (those unaffected by the elliptical cross-section) continue to acquire a smaller root diameter and a larger crest diameter, since the die flutes 12b and 13b increase gradually in depth as previously described. Accordingly, the crest diameter of the normal threads gradually approaches the maximum crest diameter of the threads at the elliptical cross-section as measured along its major axis. Moreover, due to the limits of the relieved portions 12d and 13d of the dies, this maximum thread crest diameter at the elliptical cross-section is prevented from exceeding the nominal diameter of the finished bolt. Thus, to the extent that the deforming action of the auxiliary flutes 20a and 21a leaves this maximum crest diameter in excess of the nominal bolt diameter, such excess will be eliminated by the relieved die portions 12d-13d which act to round off or "push back" the crests where they protrude from the nominal bolt diameter. However, this crest reduction does not reduce the root diameter of the threads on the major axis but tends instead to expand the flanks of these threads, thus leaving them with a pitch diameter on the major axis which is greater than the nominal pitch diameter (the pitch diameter of the normal threads).

Stated otherwise and referring to the flutes of the relieved die portions 12d and 13d at their end portions adjacent the ends of the respective dies, the spacing between opposed flute crests is essentially equal to the enlarged root diameter of the bolt threads on the major axis of the elliptical cross-section (shown somewhat exaggerated in FIG. 9); and the spacing between opposed roots of the relieved flutes is essentially equal to the nominal diameter of the final bolt.

The effect of this final thread-rolling action is illustrated in FIG. 11, where normal threads of the finished bolt are indicated at T1 and the distorted threads are indicated at T2, as viewed in an axial section of the bolt taken along the major axis of its elliptical cross-section.

As shown, the crests C of all threads have essentially the same diameter, although the crests of the distorted threads T2 are somewhat rounded. However, the roots of the distorted threads T2 have a diameter D2 greater than the root diameter D1 of the normal threads T1. Consequently, the pitch diameter of the distorted threads T2, as measured along the major axis of the bolt's elliptical cross-section, is greater than the nominal pitch diameter (i.e., the pitch diameter of the normal threads T1).

It is because of this difference in pitch diameter that the preferred new bolt provides such an effective locking action, which occurs mainly at the flanks of the distorted threads T2 in the region of the major axis of the elliptical cross-section. Moreover, since the maximum crest diameter of the distorted threads is essentially the nominal bolt diameter, there is no need to over-size the hole in the work piece through which the bolt is inserted before screwing it into the tapped hole in the other work piece. Such over-sizing results in a looseness which is objectionable, particularly when the bolt is operating in shear.

At the elliptical cross-section of the preferred new bolt, the distorted thread T2 does not necessarily have a crest which is completely circular in extending around the bolt axis, although its crest is less elliptical than the configuration represented by the varying pitch diameter of the distorted thread.

By way of example, where the new bolt has a nominal diameter of 0.5 inch, the normal threads T1 will have a crest diameter of 0.4985 inch as a maximum, and the crest diameter of the distorted threads T2 along the major axis of the elliptical cross-ection will not exceed 0.5 inch.

I claim:

1. Apparatus for making self-locking bolts from bolt blanks, which comprises a pair of coacting thread-rolling dies each provided with a working face having a series of adjacent parallel main flutes forming coplanar crests, said faces being spaced from each other to adapt them for engaging diametrically opposed parts of a said blank extending nearly transversely of said flutes, means mounting said dies for movement of one die relative to the other to roll a thread on a length of said blank by the action of said main flutes, and a plurality of adjacent parallel auxiliary flutes located on each working face and forming crests which protrude from the plane of said crests of the main flutes on said face, said protruding crests being of a length not substantially exceeding said spacing between the working faces, the auxiliary flutes being substantially fewer in number than said main flutes and being aligned longitudinally with corresponding main flutes, the auxiliary flutes being positioned on the respective working faces for simultaneously engaging, during part of said relative movement, diametrically opposed portions of the blank at only part of its said length on which the thread has been rolled by said movement, whereby said opposed portions are indented to give the bolt at its said length part an elliptical cross-section in which the pitch diameter of the thread on the major axis of the ellipse is greater than the normal pitch diameter of the thread elsewhere on said length.

2. Apparatus according to claim 1, comprising also means removably mounting said auxiliary flutes on each die.

3. Apparatus according to claim 1, in which each die has a recess opening into its working face, the apparatus comprising also an insert removably mounted in each recess and supporting said auxiliary flutes on the corresponding die, and a device associated with each die for releasably locking said insert in its recess.

4. Apparatus according to claim 1, in which a substantial number of the main flutes on each working face terminate at opposite ends of the face which are remote from the auxiliary flutes on said face, the main flutes which are longitudinally aligned with the auxiliary flutes extending from only one of said ends, the part of each working face between the auxiliary flutes and the other of said ends being relieved to prevent reduction of said greater pitch diameter on said major axis as the thread-rolling continues.

5. Apparatus according to claim 4, in which said relieved parts of the respective working faces have limiting portions engageable in opposed relation with the crest of said thread on the major axis of the ellipse during the final part of said relative movement of the dies, said limiting portions when so engaged being spaced from each other a distance equal to the nominal diameter of the threaded bolt.

6. Apparatus according to claim 5, in which said relieved parts included relieved flutes having roots which form said limiting portions, said relieved flutes of the respective working faces being engageable in opposed relation with said thread on the major axis of the ellipse and having crests which, with the relieved flutes so engaged, are spaced from each other a distance not less than the root diameter of said thread on the major axis of the ellipse.

\* \* \* \* \*

PO-1050
(5/69)

UNITED STATES PATENT OFFICE
CERTIFICATE OF CORRECTION

Patent No. 3,827,268      Dated August 6, 1974

Inventor(s) Jordan H. Stover, III

It is certified that error appears in the above-identified patent and that said Letters Patent are hereby corrected as shown below:

Column 1, line 6, "Pat. No. 3,763,90<u>3</u>" should be --Pat. No. 3,763,90<u>9</u>--.

Column 4, line 16, first occurrence of "in" should be --is--.

Signed and sealed this 21st day of January 1975.

(SEAL)
Attest:

McCOY M. GIBSON JR.
Attesting Officer

C. MARSHALL DANN
Commissioner of Patents